June 24, 1941.   L. R. TWYMAN   2,247,140
MULTIPLE VALVE UNIT
Filed Aug. 9, 1937   3 Sheets-Sheet 1

INVENTOR.
L. RAYMOND TWYMAN
BY
Barnes, Kissell, Laughlin & Raroch
ATTORNEYS.

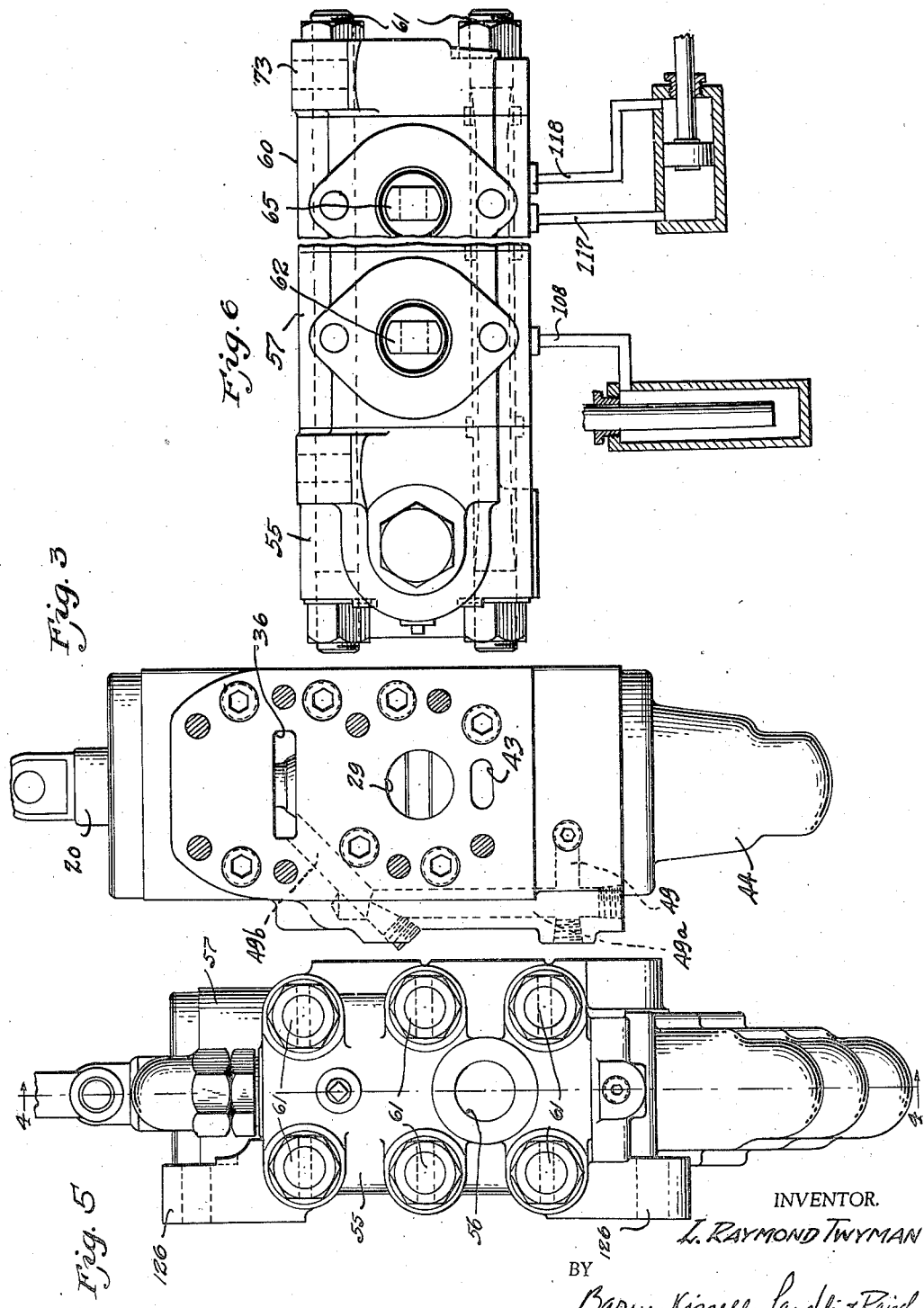

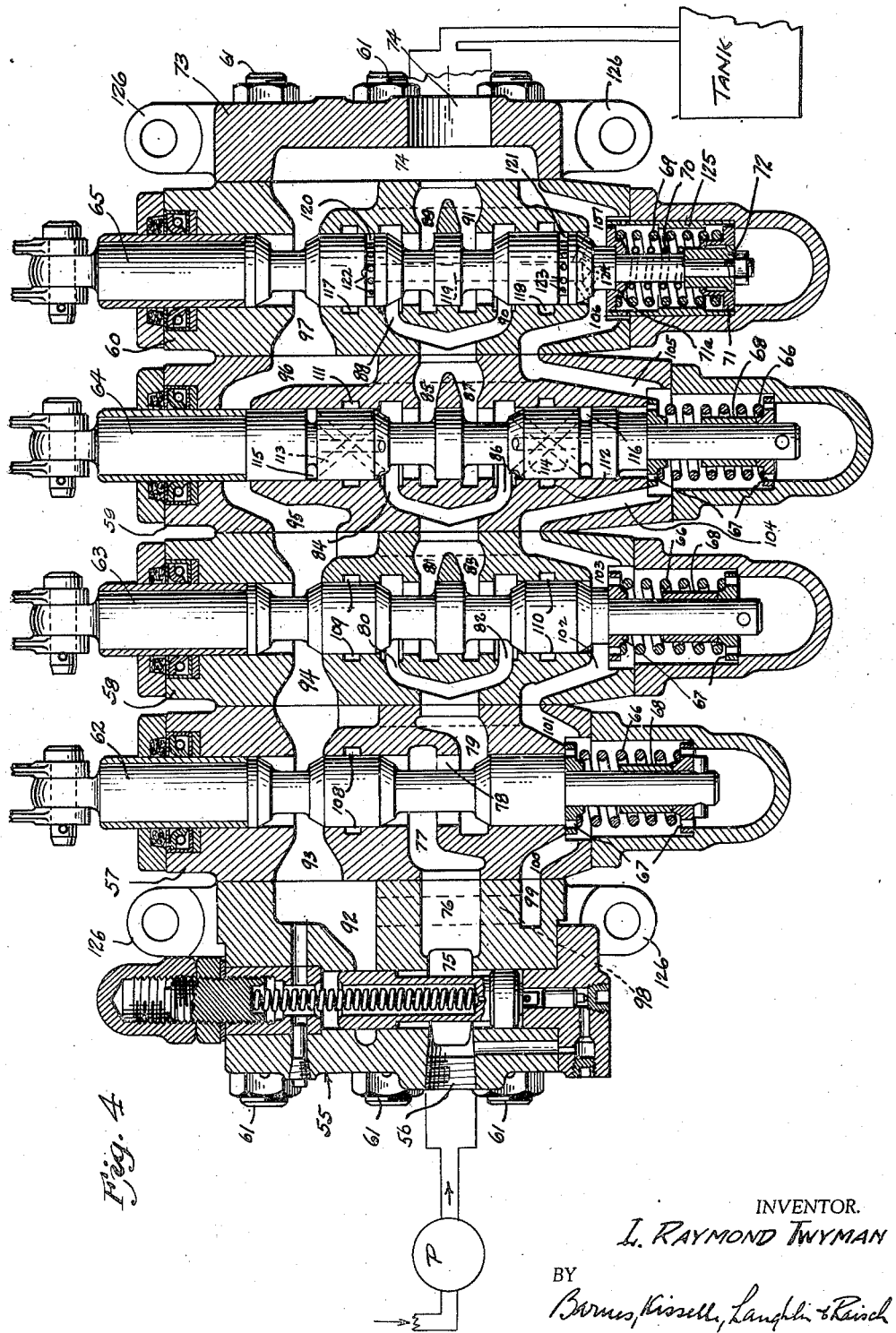

Patented June 24, 1941

2,247,140

UNITED STATES PATENT OFFICE 2,247,140

MULTIPLE VALVE UNIT

L Raymond Twyman, Detroit, Mich., assignor to Vickers, Incorporated, Detroit, Mich., a corporation of Michigan Application August 9, 1937, Serial No. 158,006

19 Claims. (Cl. 303—6)

This invention relates to a multiple valve unit and more particularly to fluid directional control valves for single and double acting cylinders especially adapted for use on snow-plows and other road machinery where simultaneous manual control of several different hydraulic appliances is necessary.

An object of the present invention is to provide a series of valve housings and valves so designed that the housings may be easily and compactly connected directly to each other to form a valve control unit for a hydraulic system having single and/or double acting power cylinders. Such joining of the valve housings will eliminate considerable piping and will form a directional control unit which is compact and convenient to operate. The valves, which are constantly in hydraulic balance, may be mounted in any desired sequence to form a compact valve bank for independently or simultaneously controlling a series of power units of the double or single acting type. Flexibility and ease of control thus obtained is very desirable in hydraulic systems where a number of cylinder motors are desired, and where one operator is expected to control all of these motors from one position. The multiple valve unit is especially applicable for snow-plows and other road machinery applications where fast and positive and sometimes simultaneous manual control of several different hydraulic appliances is necessary.

The valve housings are so designed that a balanced relief valve may be integrally attached. A further object of the valve unit is that, in the absence of movement of the various units being controlled, the hydraulic pressure source is automatically unloaded, but is protected at all times from overload by relief.

Other objects and advantages of the invention will appear in the course of the following description:

Fig. 3 is an end view of the assembly taken on the lines 3—3 of Fig. 1.

Fig. 4 is a cross sectional view of another multiple valve unit showing a relief valve and a series of four motor control valves arranged in tandem in a valve bank.

Fig. 5 is an end view of the assembly shown in Fig. 4.

Fig. 6 is a plan view of the same.

Figures 1, 2:
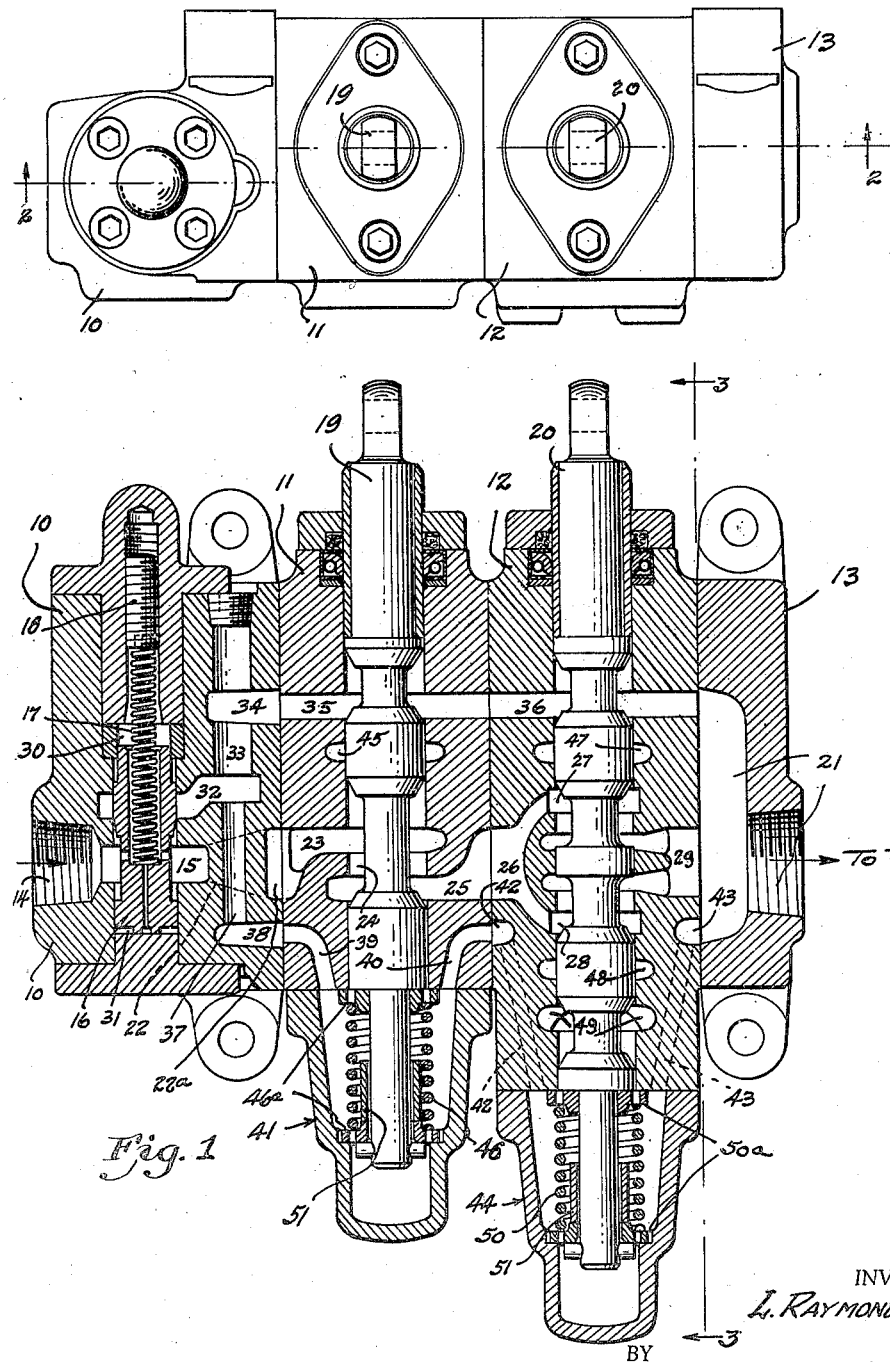
Fig. 1 is a cross sectional view of a multiple valve unit showing a relief valve, a control valve for a single acting cylinder, a control valve for a double acting cylinder, and an end manifold.
Fig. 2 is a plan view of the same.

It is thought that the invention may best be disclosed by describing the structure and operation of the valve housings and valves as they operate when located in a hydraulic circuit. Referring to Fig. 1, a relief valve housing 10 is connected in series with valve housings 11 and 12 and an end plate 13 serves as a connection plate at the end of the housing 12. Oil pressure is supplied by a pump (not shown) through an inlet port 14 to an annular port 15 of the relief valve housing 10. A relief valve piston 16 is normally positioned as shown in Fig. 1. A spring 17 which resists the movement of this relief valve piston 16 may be set by a screw 18 for any desired pressure. Spring centered valve spools 19 and 20 are shown positioned centrally located in the longitudinal bore of the housings 11 and 12, respectively. These valve spools 19 and 20, as shown in Fig. 1, are in neutral position. When both of these valve spools 19 and 20 are in this neutral position, liquid under pressure will flow from the pressure port 14 to a tank port 21 through ports 15 and 22 in the housing 10, ports 23, 24 and 25 in the housing 11, and ports 26, 27, 28 and 29 in the housing 12. The pressure source will be unloaded under these circumstances.

If the above described passage from the pressure port 14 to the tank port 21 becomes blocked, or if the pressure therein rises to a point above the setting of the spring 17, pressure in the port 15 will build up, the oil will fill the chambers 30 and 31 through the small central bores in the valve piston 16. Since the exposed pressure areas of the valve piston 16 differ in the chambers 30 and 31, the area exposed in chamber 31 being greater, there will be a differential pressure acting on the relief valve piston 16. This differential pressure will force the valve piston upward against the spring 17 and will allow pressure from the port 15 to be directed to a relief port 32 in the valve housing 10. This port 32 is connected to the tank port 21 through passageways 33 and 34 in the housing 10, passageway 35 in the housing 11, and passageway 36 in the housing 12.

It will be seen that the relief port 32 is also connected to the tank port 21 through passageways 37 and 38 in the housing 10, passageways 39 and 40 and an end cap 41 of the housing 11, and then through passageways 42, 43 and an end cap 44 of housing 12.

Valve housing 11 and valve spool 19 are adapted to control a single acting cylinder or rotary motor. The housing 11 is provided with a motor or cylinder port 45. Assuming that the relief piston 16 is in its normal position shown in Fig. 1, if the valve spool 19 is moved upwardly against a centering spring 46, positioned between spring seats 46a, the cylinder port 45 will be opened to the pressure port 23 and the passageway 24, which normally leads to the tank port 21, will be closed. If the valve spool 19 is moved downward against the centering spring 46, from its position in Fig. 1, the pressure port 23 will again be opened to the tank through ports 24, 25, 26, 27, 28 and 29 and the cylinder port 45 will be opened to the tank port 21 through the passageways 35 and 36.

Valve housing 12 and valve spool 20 are adapted to control a double acting cylinder or reversible motor. Housing 12 is provided with motor or cylinder ports 47 and 48 and with a tank port 49. When valve spool 20 is moved upward from its neutral position in Fig. 1 against the spring 50, which is positioned between spring seats 50a, the cylinder port 47 will be connected to the pressure port 15 through ports 23, 24, 25, 26, and 27, while the cylinder port 48 will be connected to the tank passage 36 through port 49 and passageways 49a and 49b (see Fig. 3). This upward movement will close the port 28 so that the tank port 21 is closed to the pressure line. Similarly, if the valve spool 20 is moved downwardly against the spring 50, the cylinder port 47 will be opened to the tank port 21 through passageway 36, the port 27 will be closed from the tank port 21, and the cylinder port 48 will be opened to oil pressure through the ports 22, 23, 24, 25, 26, 28 and 29. Spacers 51 in cooperation with the spring seats 46a and 50a control the extent of the movement of the valve spools 19 and 20, though it will be seen that the spools 19 and 20 can be manipulated to throttle the pressure flowing into the cylinder ports. For example, a raising of spool 19 slightly will permit pressure to flow into cylinder port 45 and through port 24 to spool 20 so that both may direct pressure simultaneously to their respective cylinder ports.

A further illustration of the invention is shown in Fig. 4 where four different types of valves and valve housings are connected in series with a relief valve and connection plate. A relief valve similar to that shown in Fig. 1 is shown generally at 55 with a pressure port 56. Valve housings 57, 58, 59 and 60 are directly connected to each other by longitudinally extending bolts 61 and have registering ports or openings which do away with any piping between the valve housings. Valve spools 62, 63, 64 and 65 are slidably located in a central longitudinal bore in the housings 57 to 60, respectively. Valve spools 62, 63 and 64 are held in neutral position as were the valves in Fig. 1, by springs 66 and spring seats 67 and the longitudinal extent of their movement is controlled by spacers 68.

The valve spool 65 is held in neutral position by two springs 69 and 70 acting on flanged spring seats 71, 71a and 72, and its longitudinal movement is controlled by these spring seats, as will later be explained. A connection plate 73 is fastened to the valve housings 60 by the bolts 61 and is provided with a tank port 74. With all the valves in neutral position, as shown in Fig. 4, oil from the pressure source will enter the multiple valve unit at port 56 in the relief valve 55 and will proceed to the tank port 74 through ports numbered from 75 to 91. It will thus be seen that the pump or pressure source, of any hydraulic system in which the valves are used, will be unloaded except when the valves are directing pressure to their respective motors. If this path to the tank port 74 is blocked by the shifting of a valve piston or for any other reason, so that the pressure rises to a point above the spring setting of the balanced relief valve 55, the relief valve piston will be forced upward and the pressure from port 56 will be shunted to the tank port 74 through port 92 in the relief valve 55 and ports 93, 94, 95, 96 and 97 in the valve housings. Port 92 in the relief valve 55 is also connected to the tank port 74 through venting ports 98 and 99 in the relief valve 55 and venting ports 100 to 107 in the valve housings 57 to 60.

The valve housing 57 of the valve piston 62 is adapted to control a single acting cylinder motor or a rotary fluid motor, the valve housing 57 being provided with one annular cylinder port 108. The valve piston 63 in valve housing 58 is adapted to control a double acting cylinder or reversible motor, the housing 58 being provided with annular cylinder or motor ports 109 and 110. The action of these last named single and double acting control valves is identical to the valves 19 and 20 described in connection with Fig. 1 and will not be enlarged upon here.

Valve housing 59 and valve spool 64 are adapted to control a double acting cylinder or reversible motor, but the housing 59 is designed to have no discharge to the tank, the discharge from each cylinder port being to the pressure port of the next valve in line rather than to the tank port. The housing 59 is provided with cylinder ports 111 and 112, and the design of the valve spool 64 differs from that of the valve spools previously described in that the angularly disposed holes 113 and 114 have been drilled in the valve spool to connect the central annular grooves of the valve spool, which are exposed respectively to valve ports 84 and 86, to annular grooves 115 and 116. When the valve spool 64 is moved upwardly, the pressure port 84 is connected to the cylinder port 111, the cylinder port 112 is connected through the holes 114, in the spool 64, to the pressure outlet port 87. Similarly, if the valve spool 64 is moved downwardly, the pressure port 86 will be connected to the cylinder port 112, and the cylinder port 111 will be connected to the pressure outlet port 85 through the holes 113.

It will be seen that the ports 95—96 and 104—105 in the valve housing 59, being annular, will take care of the discharge from valves 55, 62 and 63. The valve housing 60 and valve spool 65 are also adapted to control a double acting cylinder motor but this valve unit has what will be called a float position. The valve housing 60, which is of the same design as the valve housing 58, is provided with cylinder ports 117 and 118. The valve spool 65 has a central bore 119 which is connected to annular grooves 120 and 121 by radially extending holes 122 and 123, and the central bore 119 is also connected to the vent ports 106 and 107 by holes 124. When valve spool 65 is moved upwardly against the spring 70 until an outer flange of the spring seat 72 contacts an inner flange of the spring seat 71, the cylinder port 117 will be connected, through the holes 122 and 123 and the central bore 119, to the cylinder port 118. The central bore is connected through the holes 124 to the tank, and thus both cylinder ports 117 and 118 are in turn connected to tank ports 107 and 74. This is the float position.

The valve spool 65 may further be moved upwardly against the spring 69 until the outer spring seat 71 contacts an inner positive stop of the spacer 125. In this position the pressure port 88 will be connected to the cylinder port 117, while the cylinder port 118 will be connected through vents 106 and 107 to the tank port 74. If the valve spool 65 is moved downwardly from its neutral position in Fig. 4 until the spring seat 71a contacts a stop of the spacer 125, the pressure port 90 will be connected to the cylinder port 118, while the cylinder port 117 will be connected through port 97 to the tank port 74.

The tank plate 73, which is always assembled to the end of any multiple valve unit, connects ports 97 and 107 to each other and to pressure ports 89, 91 and to the tank port 74. It will be seen that the tank plate 73 and the housing of the valve 55 have lugs 126 formed thereon for mounting the valve assembly.

The valve housings 55, 57, 58, 59 and 60 and the tank plate 73 are assembled with gaskets therebetween and, due to the location of the ports in said valve housings including the tank ports, pressure ports and vent ports, the valve housings may be assembled in any sequence and in any number desired, except that the valve housing 59 can not be in the end position adjacent the tank plate. The cylinder motors connected with valve housings 58, 59 and 60 can be operated simultaneously or independently as desired, except that when the single acting cylinder motor is being operated by the valve 57, the remaining valves along the line will be cut off from the pressure supply. This position of the valve 57 is for safety purposes to prevent operation of valve 57 simultaneously with the other valves, though, as previously explained with reference to housing 11 and valve spool 19, a slight upward movement of valve spool 62 will admit pressure to motor port 108 and also through port 78 to the remaining valves in the system, so that each or all of the valves in the system can direct pressure simultaneously to any of their respective pressure or motor ports.

The flexibility of the valve unit may be well illustrated by the fact that if desired the relief valve and pressure inlet port housings 10 and 55, of Fig. 1 and Fig. 4, respectively, could be interchanged with the respective manifold tank plates 13 and 73 of said Figs. 1 and 4 and the simultaneous or independent operation of the various valves of the multiple valve unit would be unchanged. With this arrangement all of the valves may be operated simultaneously, including the single motor port valves 11 and 57.

It will be seen that when any of the valve spools are in neutral position the oil in the cylinder motors will be locked to hold the pistons of said motors in position. Furthermore, the operating valve spools are constantly in hydraulic balance due to the fact that the fluid pressure is exposed constantly to equal and opposing radially extending areas on said valve spools. Any suitable lever or handle can be connected to the upper ends of the valve spools to allow easy shifting of the same to and from various operating positions.

I claim:

1. A control valve bank adapted to be used in road machinery or the like having a pressure source and supply tank and a plurality of selective single and/or double acting hydraulic motors, said valve bank comprising a series of interchangeable valve housings provided with transverse pressure and tank passageways, and one or more motor ports, said passageways being located such that the pressure and tank passageways of the respective housings will register when said housings are placed side by side in any sequence in a valve bank.

2. A control valve bank made up of a plurality of interchangeable valve units adapted to be used in road machinery control, some adapted to control a single acting hydraulic motor and some adapted to control a double acting hydraulic motor, said valve units comprising a housing provided with transverse pressure and tank passageways and with one or two motor ports, said passageways being located such that the pressure and tank passageways will register, when said housings are placed in alignment in any sequence in a valve bank, to form continuous passageways open only at each end of said valve bank, and valve stems in said housings adapted to be shifted therein to control the flow of liquid between said passageways and said motor ports.

3. A multiple valve bank comprising a plurality of interchangeable valve housings arranged adjacent each other and having pressure and tank passageways in series from one end of the bank to the other, said valve housings consisting of single and/or double acting valve housings, slidable valve spools in each of said housings for directional control of fluid, an independently operated relief valve joined with said housings and having a pressure connection for a valve bank pressure passageway, and a spring biased member in said relief valve adapted to connect said pressure connection to a valve bank tank passageway upon being subjected to a predetermined maximum pressure.

4. A plurality of interchangeable valves having different operative functions positionable together to form a manifold, supporting end connection plates comprising, respectively, a pressure connection and a tank connection, said valves having openings which form continuous pressure and tank passageways between said end plates, and each of said valves having one or more motor ports, and balanced slidable valve spools in said valves for simultaneously or independently interconnecting said continuous passageways and said motor ports, each individual valve being interchangeable or removable from the bank at will.

5. A multiple valve bank comprising a plurality of valve housings arranged in abutting relationship and having a main continuous passageway and an auxiliary continuous passageway through said bank, each of said valves having one or more motor ports, connection plates at each end of said bank comprising, respectively, a pressure connection and a tank connection, said main passageway being normally open to the tank connection, and slidable balanced valve spools in said valve housings, each movable from a neutral position to operative positions to interconnect said continuous passageways and said motor ports and arranged to block said motor ports when in neutral position and to close said main passageway to the tank connection when connecting the main passageway to any of said motor ports.

6. A multiple valve bank comprising a plurality of valve housings arranged in abutting relationship and having a main continuous passageway and an auxiliary continuous passageway, through said bank, each of said valves having one or more motor ports, connection plates at each end of said bank comprising, respectively, a pressure connection and a tank connection, said main passageway being normally open to the tank connection, slidable balanced valve spools in said valve housings for interconnecting said continuous passageways and said motor ports and arranged to close said main passageway to the tank connection when connecting the main passageway to any of said motor ports, and an independent relief valve normally closing said auxiliary passageway and arranged to open said auxiliary passageway to said pressure connection at a predetermined maximum pressure.

7. A control valve bank comprising a valve housing for controlling a single acting hydraulic motor and a valve housing for controlling a double acting motor, said valve housings being arranged in abutting relationship and having substantially parallel continuous pressure and exhaust passageways therethrough, and hydraulically balanced slidable valve stems adapted to permit simultaneous control of said single and double acting motors.

8. A control valve bank comprising a valve housing having a single motor port and a valve housing having two motor ports, said valve housings being arranged in abutting relationship and having openings arranged to form continuous pressure and exhaust passageways through said valve bank, a supporting end plate on each of said valves having respectively, pressure connections and tank connections, and valve spools slidably mounted in said valves and arranged to direct pressure independently or simultaneously to one of the motor ports of each valve.

9. A control valve bank made up of a plurality of valve units, some adapted to control a single acting hydraulic motor and some adapted to control a double acting hydraulic motor, said valve units comprising a housing provided with pressure and tank passageways and with one or two motor ports, said ports being located such that the pressure and tank ports will register, when said housings are placed in alignment in any sequence in a valve bank, to form continuous passageways open only at each end of said valve bank, and valve stems in said housings adapted to be shifted therein to control the flow of liquid between said passageways and said motor ports, a tank connection plate at one end of said valve bank, and a maximum pressure relief valve at the other end of said valve bank adapted to by-pass liquid under pressure from said pressure passageway.

10. In a fluid pressure system having a pressure source and tank and a plurality of single and double acting cylinder motors, an operating valve for each of said cylinder motors comprising a valve housing substantially rectangular in shape provided with cylinder ports on one side thereof and with pressure and tank passageways passing through said valve housing and forming ports on opposite sides of the housing, adjacent the cylinder port side and a valve spool adapted to slidably fit in said housing with one end projecting therefrom for operation of the same, said valve housings being so designed that they may be connected directly to each other in any sequence to form a compact valve bank having continuous passageways, the pressure and tank ports of one housing being located to register with the pressure and tank ports of the adjacent housings, said valve bank being connected at one end to a pressure connection and at the other to a tank connection.

11. In a multiple valve unit of the type used in series with a pressure source and tank for the control of a plurality of single and double acting fluid motors, an operating valve for each of said motors comprising a substantially rectangular valve housing provided with pressure, tank, and motor ports, said motor ports being located on one side of said housing, and said pressure and tank ports being located on each of the two sides adjacent said motor port side, said housing being designed to be arranged in a continuous valve bank, the pressure and tank ports of each of said housings being located to register with each other to form continuous pressure and tank passageways through said valve bank, and a valve stem slidably disposed in said housing having equal opposed radially extending areas constantly exposed to the pressure in said housing.

12. A control valve bank comprising different types of valve housings including single acting, double acting and float position valves, said housings being arranged in series in abutting relationship to form a manifold having continuous passageways end to end, pressure balanced directional valve spools in said housings, and end connection plates for providing connections with a pump and tank.

13. In a fluid pressure system having a pump and a tank, and a plurality of single and/or double acting motors, a multiple valve bank comprising a plurality of valve housings arranged in abutting relationship and having continuous pressure and tank passageways through said bank, each of said valves having one or more motor ports, connection plates at each end of said bank comprising, respectively, a pressure connection from said pump to one of said passageways, and a tank connection from said passageways, a valve spool in each of said housings slidable from a neutral position to one or more operative positions to direct pressure to a motor, and means for normally maintaining said valve spools in a neutral position whereby said pump is unloaded to said tank through one of said passageways, and for automatically returning said spools from operative position to said neutral position.

14. In a fluid pressure system having a pump and a tank, and a plurality of single and/or double acting motors, a multiple valve bank comprising a plurality of valve housings arranged in abutting relationship and having continuous passageways through said bank, each of said valves having one or more motor ports, a valve spool in each of said housings slidable from a neutral position to one or more operative positions to direct pressure to and from a motor, and spring return means for each of the valve spools for automatically returning the valve spools from operative to neutral position, said passageways being so arranged that when all of said valve spools are returned to neutral position, said pump is automatically unloaded to said tank.

15. A control valve bank made up of a plurality of interchangeable valve units having different operative functions and adapted to be used for controlling road machinery and the like, said valve units comprising a housing provided with transverse pressure and tank passageways and with one or more motor ports, said passageways being located such that the pressure and tank passageways will register when said housings are placed in alignment in any sequence in a bank, to form continuous passageways open only at each end of said valve bank, and valve stems in said housings having a neutral position whereby all of said motor ports are blocked, said stems being shiftable therein to control the flow of liquid between said passageways and said motor ports.

16. A valve comprising a body having end covers thereon, a bore through said body, a valve piston reciprocable in said bore, a recess in said bore and a motor port communicating therewith, high-pressure and relief passages intersecting said bore, an inlet in one of said covers and an outlet in the other communicating respectively with said high-pressure and relief passages, said piston having recessed portions adapted to place said recess in communication with one or the other of said passages when said piston is so positioned that said portions overlap said recess, a relief valve mounted on the end cover having said inlet, and passages in said inlet cover and relief valve connecting the high-pressure side of the relief valve to the inlet and the low-pressure side of the valve to said relief passage.

17. A multiple valve bank comprising a plurality of interchangeable valve sections, one section comprising a valve body having two motor ports to control a double acting motor and another section comprising a valve body having one motor port to control a single acting motor, each body comprising a longitudinal valve bore having a transverse pressure passage and a transverse exhaust passage, each extending through the body and terminating in alignment with the same passages in an adjacent body, a valve spool slidable in said bore and having lands and recesses to control communication of said motor ports with said passages, and end plates secured one to each end valve of the bank and providing pressure and exhaust connections registering with said passages to provide a common inlet and a common outlet connection to each valve of the bank.

18. A multiple valve bank comprising a plurality of interchangeable valve sections, each section comprising a body having oppositely facing parallel surfaces in abutment with a similar surface on an adjacent section, a longitudinal valve bore in each body, and a single passageway extending through said body between aligned openings in said surfaces and intersecting the bore at spaced points to form a continuously extending passageway through the valve bank from end to end, a valve spool shiftable in each bore between at least two positions in one of which said passageway is blocked at the bore and in the other of which said passageway is open, end plates secured one to each end valve of the bank and providing a common inlet and a common outlet to the bank, said passageway being in permanent open communication at one end thereof with said inlet and at the other end thereof with the outlet, at least one motor port in each bore communicating with the outside of the body outside of said surfaces, means on each valve for selectively connecting the motor port with the inlet or the outlet, said spool and passageway being arranged so that when the passageway is open through all the valves of the bank the inlet is connected directly to the outlet and, when said passageway is blocked at any particular valve, pressure in the passageway will build up ahead of that valve.

19. A multiple valve bank comprising a plurality of valves each having longitudinal valve bores, and a single passageway extending through all of said valves and intersecting said bores at spaced points to form a continuously extending passageway through the valve bank from end to end, a valve spool shiftable in each bore between at least two positions in one of which said passageway is blocked at the bore and in the other of which said passageway is open, means providing a common inlet and a common outlet to the bank, said passageway being in permanent open communication at one end thereof with said inlet and at the other end thereof with the outlet, at least one motor port in each bore and communicating with the outside of the respective valves, and means on each valve for selectively connecting the motor port with the inlet or the outlet, said spool and passageway being arranged so that, when the passageway is open through all the valves of the bank, the inlet is connected directly to the outlet and, when said passageway is blocked at any particular valve, pressure in the passageway will build up ahead of that valve.

L RAYMOND TWYMAN.